(12) United States Patent
Wang et al.

(10) Patent No.: US 11,099,682 B2
(45) Date of Patent: Aug. 24, 2021

(54) BINDING REGION CONNECTION STRUCTURE, TOUCH SCREEN AND DISPLAY DEVICE

(71) Applicants: BOE TECHNOLOGY GROUP CO., LTD., Beijing (CN); Hefei Xinsheng Optoelectronics Technology Co., Ltd., Anhui (CN)

(72) Inventors: Qingpu Wang, Beijing (CN); Lei Zhang, Beijing (CN); Tsungchieh Kuo, Beijing (CN); Zhi Zhang, Beijing (CN); Xiaoyue He, Beijing (CN)

(73) Assignees: BOE Technology Group Co., Ltd., Beijing (CN); Hefei Xinsheng Optoelectronics Technology Co., ltd., Hefei (CN)

( * ) Notice: Subject to any disclaimer, the term of this patent is extended or adjusted under 35 U.S.C. 154(b) by 415 days.

(21) Appl. No.: 16/303,636

(22) PCT Filed: Mar. 29, 2018

(86) PCT No.: PCT/CN2018/080975
§ 371 (c)(1),
(2) Date: Nov. 20, 2018

(87) PCT Pub. No.: WO2018/223753
PCT Pub. Date: Dec. 13, 2018

(65) Prior Publication Data
US 2021/0117066 A1 Apr. 22, 2021

(30) Foreign Application Priority Data
Jun. 9, 2017 (CN) .......................... 201720667455.8

(51) Int. Cl.
G06F 3/044 (2006.01)
G06F 3/041 (2006.01)
G06F 3/047 (2006.01)

(52) U.S. Cl.
CPC .......... *G06F 3/04164* (2019.05); *G06F 3/047* (2013.01); *G06F 3/0412* (2013.01);
(Continued)

(58) Field of Classification Search
CPC . G06F 2203/04102; G06F 2203/04103; G06F 3/041; G06F 3/0412; G06F 3/04164; G06F 3/0443; G06F 3/0446; G06F 3/04
(Continued)

(56) References Cited

U.S. PATENT DOCUMENTS

2005/0127936 A1* 6/2005 Chen ....................... G09G 3/006
324/760.01
2006/0017448 A1* 1/2006 Chen .................. G01R 1/07378
324/538
(Continued)

FOREIGN PATENT DOCUMENTS

| CN | 204009826 U | 12/2014 |
| CN | 104679344 A | 6/2015 |
| CN | 206931070 U | 1/2018 |

OTHER PUBLICATIONS

International Search Report and Written Opinion dated Jul. 5, 2018, from application No. PCT/CN2018/080975.

*Primary Examiner* — Tony O Davis
(74) *Attorney, Agent, or Firm* — Arch & Lake LLP

(57) ABSTRACT

The present disclosure provides a bonding region connection structure, a touch screen, and a display device. The bonding region connection structure for connecting a touch substrate and a flexible printed circuit includes: a plurality of electrode trace pins disposed at the bonding region, wherein the bonding region is between the touch substrate and the flexible printed circuit, each of the plurality of the electrode trace pins being respectively configured to connect to a touch electrode on the touch substrate and an electrode on the flexible printed circuit; and a plurality of dummy pins respectively disposed on both sides of the electrode trace pins, one end of each of the plurality of dummy pins leading to the touch electrode being respectively connected to a
(Continued)

corresponding first test point by a lead wire, and configured to measure impedance of the bonding region.

12 Claims, 4 Drawing Sheets

(52) U.S. Cl.
CPC .......... *G06F 3/0443* (2019.05); *G06F 3/0446* (2019.05); *G06F 2203/04102* (2013.01); *G06F 2203/04103* (2013.01)

(58) Field of Classification Search
USPC .................................................. 345/170–178
See application file for complete search history.

(56) References Cited

U.S. PATENT DOCUMENTS

| | | | |
|---|---|---|---|
| 2010/0007627 A1* | 1/2010 | Lai | G06F 3/0446 345/174 |
| 2011/0050624 A1* | 3/2011 | Lee | G06F 3/045 345/174 |
| 2013/0021268 A1* | 1/2013 | Lee | G06F 3/0416 345/173 |
| 2013/0057495 A1* | 3/2013 | Wang | G06F 3/0446 345/173 |
| 2014/0015563 A1* | 1/2014 | Kao | G06F 3/04164 324/763.01 |
| 2014/0187088 A1* | 7/2014 | Kim | G02F 1/1309 439/620.01 |
| 2015/0346869 A1* | 12/2015 | Jang | G06F 3/04164 345/174 |
| 2016/0070376 A1* | 3/2016 | Lee | H05K 1/0281 345/173 |
| 2016/0252989 A1* | 9/2016 | Zhang | G06F 3/0443 345/173 |
| 2016/0286640 A1 | 9/2016 | Shao et al. | |
| 2017/0123570 A1* | 5/2017 | Maruyama | G06F 3/04164 |
| 2017/0242457 A1* | 8/2017 | Lee | G06F 1/1643 |
| 2019/0004645 A1* | 1/2019 | Wang | G06F 3/041 |
| 2019/0116662 A1* | 4/2019 | Li | G02F 1/133 |
| 2019/0116672 A1* | 4/2019 | Zhao | G01R 31/2818 |
| 2019/0212850 A1* | 7/2019 | Kim | G06F 3/0443 |
| 2020/0210041 A1* | 7/2020 | Liu | G06F 3/04164 |

* cited by examiner

US 11,099,682 B2

BINDING REGION CONNECTION STRUCTURE, TOUCH SCREEN AND DISPLAY DEVICE

CROSS-REFERENCE TO RELATED APPLICATIONS

The present application is based on International Application No. PCT/CN2018/080975 filed on Mar. 29, 2018, which claims priority to Chinese Patent Application No. 201720667455.8, filed on Jun. 9, 2017 and entitled "Binding Region Connection Structure, Touch Screen and Display Device", the entire contents thereof are incorporated herein by reference and constitute part of this application.

TECHNICAL FIELD

The present disclosure relates to the field of touch display technology, and in particular, to a binding region connection structure, a touch screen, and a display device.

BACKGROUND

At present, the reliability requirement on the touch display device market in wearable devices, vehicular devices, medical, industrial control and other fields is increasing. In particular, requirements on the conduction state of the bonding region of the touch substrate and the flexible printed circuit (FPC) are increasing.

Currently, the conduction state of the bonding region is monitored mainly by manually observing the blasting condition of the conductive particles. However, the conduction state of the bonding state cannot be guaranteed to be good even if the blasting of the conductive particles is good. Thus, the above method for monitoring the conduction state of the bonding region is not accurate at the moment.

SUMMARY

The present disclosure provides a bonding region connection structure, a touch screen and a display device, and thus at least to some extent overcomes one or more problems due to limitations and disadvantages of the related art.

Other features and advantages of the present disclosure will be apparent from the following detailed description, or will partly be learned by practice of the present disclosure.

According to an aspect of the present disclosure, there is provided a bonding region connection structure for connecting a touch substrate and a flexible printed circuit includes: a plurality of electrode trace pins disposed at the bonding region, wherein the bonding region is between the touch substrate and the flexible printed circuit, each of the plurality of the electrode trace pins being respectively configured to connect to a touch electrode on the touch substrate and an electrode on the flexible printed circuit; and a plurality of dummy pins respectively disposed on both sides of the electrode trace pins, one end of each of the plurality of dummy pins leading to the touch electrode being respectively connected to a corresponding first test point by a lead wire, and configured to measure impedance of the bonding region.

In an exemplary arrangement of the present disclosure, wherein the plurality of electrode trace pins are distributed in a single row array and disposed at an intermediate portion of the bonding region, and the plurality of dummy pins respectively are disposed on both sides of the intermediate portion of the bonding region.

In an exemplary arrangement of the present disclosure, the plurality of electrode trace pins have same length, and a length of the dummy pin is gradually shortened in a direction away from the intermediate portion of the bonding region.

In an exemplary arrangement of the present disclosure, at least two of the dummy pins are respectively disposed on both sides of the intermediate portion of the bonding region.

In an exemplary arrangement of the present disclosure, three dummy pins are respectively disposed on both sides of the intermediate portion of the bonding region.

In an exemplary arrangement of the present disclosure, a ratio of lengths of the electrode trace pins to lengths of the corresponding dummy pins in the direction away from the intermediate portion of the bonding region is 1:1:0.75:0.5.

In an exemplary arrangement of the present disclosure, wherein a ratio of effective conduction areas of dummy pins corresponding to the first test points is 2:3:4, and the effective conduction areas of dummy pins are gradually shortened in the direction away from the intermediate portion of the bonding region.

In an exemplary arrangement of the present disclosure, one end of each of the plurality of dummy pins leading to the electrode is connected to a corresponding second test point by a connecting finger, and the second test point and the first test point corresponding to the same dummy pin form a test channel.

In an exemplary arrangement of the present disclosure, the first test point, the second test point and the lead wire are made from material of the same layer.

In an exemplary arrangement of the present disclosure, the first test point is integrally formed with the lead wire and the dummy pin.

Another arrangement of the present disclosure further discloses a touch screen including: a touch substrate, a flexible printed circuit, and the above-mentioned bonding region connection structure.

In still another arrangement of the present disclosure, there is provided a display device including the above-mentioned touch panel.

It should be understood that the above general description and the following detailed description are intended to be illustrative and not restrictive.

BRIEF DESCRIPTION OF THE DRAWINGS

The accompanying drawings, which are incorporated in and constitute part of the specification, are intended to explain the principle of the present disclosure. It is apparent that the drawings in the following description are only some of the arrangements of the present disclosure, and other drawings may be obtained from these accompanying drawings by those skilled in the art without any creative work.

DETAILED DESCRIPTION

Figure 1:
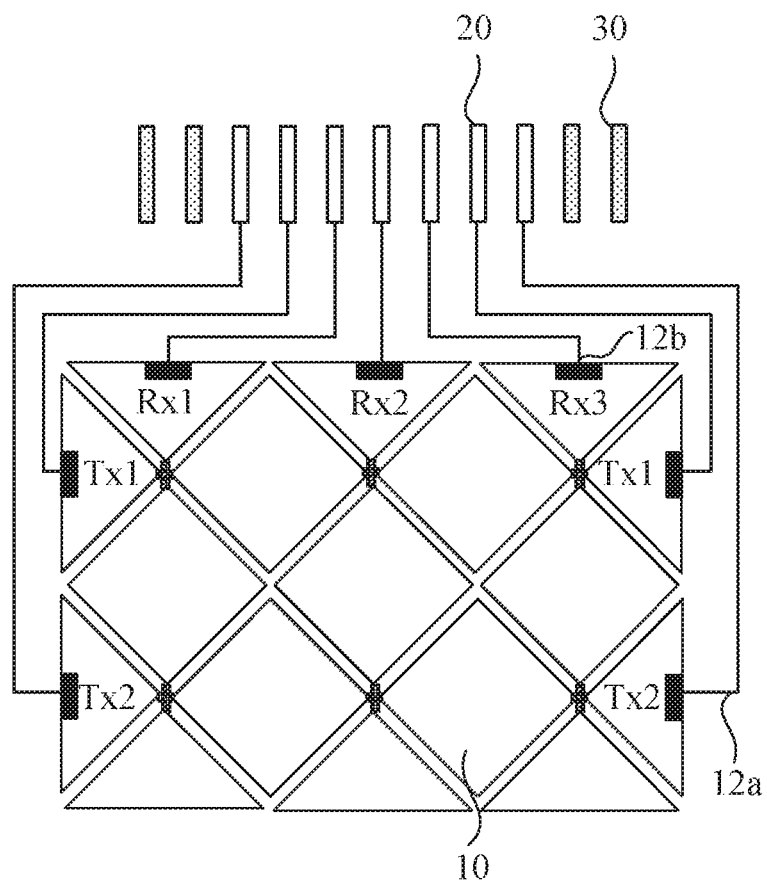
FIG. 1 is a schematic diagram showing a design structure of a bonding region in a related arrangement of the present disclosure.

Example arrangements will now be described more fully with reference to the accompanying drawings. However, example arrangements can be embodied in a variety of forms and should not be construed as being limited to the examples set forth herein; rather, these arrangements are provided so that the present disclosure will be more comprehensive and complete, and will fully provide ideas of these arrangements to those skilled in the art. The accompanying drawings are only schematic representations of the present disclosure, and are not necessarily to scale. The same reference numerals in the drawings denote the same or similar parts, and the repeated description thereof will be omitted.

Furthermore, the described features, structures, or characteristics may be combined in any suitable manner in one or more arrangements. In the following description, numerous specific details are provided to fully understand arrangements of the present disclosure, However, in order to practice technical solutions of the present disclosure, those skilled in the art will appreciate that one or more of the specific details may be omitted, or other methods, components, devices, blocks, etc. may be employed. In other instances, well-known structures, methods, devices, implementations, materials, or operations will not be shown in detail to avoid obscuring aspects of the present disclosure.

Some of the block diagrams shown in the figures are functional entities and do not necessarily have to correspond to physically or logically separate entities. These functional entities may be implemented in software, or implemented in one or more hardware modules or integrated circuits, or implemented in different networks and/or processor devices and/or microcontroller devices.

FIG. 1 is a schematic diagram showing a design structure of a bonding region in a related arrangement of the present disclosure. As shown in FIG. 1, a display area of a touch screen is provided with a plurality of touch electrodes 10 arranged in an array, and each touch electrode 10 is correspondingly provided with electrode traces 12a and 12b, wherein the electrode trace 12a is connected to a transmitting terminal Tx1 and Tx2 of the touch electrode 10, and the electrode trace 12b is connected to a receiving terminal Rx1, Rx2 and Rx3 of the touch electrode 10. Generally, a peripheral area of one side of a display area is provided with a bonding region, wherein a plurality of electrode trace pins 20 are disposed in an intermediate area of the bonding region, and electrode traces 12a and 12b are respectively connected with corresponding electrode trace pins 20. In order to enhance for example the tensile fatigue test performance of the display device, dummy pins 30 are usually disposed on both sides of the intermediate portion of the bonding region. As shown in FIG. 1, two dummy pins 30 are respectively disposed on both sides of the intermediate portion of the bonding region in FIG. 1. The dummy pin 30 is not connected to any electrode, and lengths of both the dummy pin 30 and the electrode trace pin 20 are 1 mm.

Figure 2:
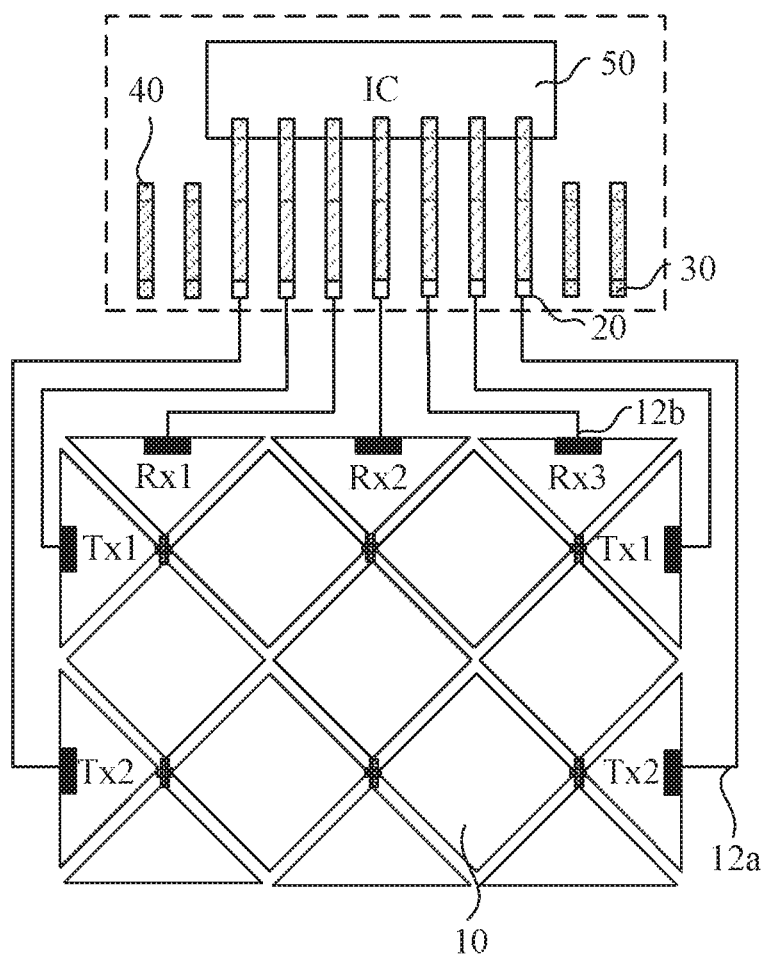
FIG. 2 is a schematic diagram showing an overall design structure of a corresponding bonding region and an integrated circuit in a related arrangement of the present disclosure.

On the basis of FIG. 1, FIG. 2 also shows a schematic diagram of an overall design structure of the corresponding bonding region and an integrated circuit. As shown in FIG. 2, the electrode trace pin 20 of the bonding region is a pin that is normally connected to a circuit, and is bondingly connected to a connecting finger 40 of the flexible printed circuit (FPC) and then connected to inside of the integrated circuit (IC) 50. The dummy pin 30 is not connected to any circuit after bondingly connected to the connecting finger 40 of the FPC.

Therefore, the structure of the bonding region shown in FIG. 1 and FIG. 2 merely increases a bonding length of the FPC by providing dummy pins, and functions to increase strength of welding spots at the FPC, however, the function of the test cannot be realized.

Figure 3:
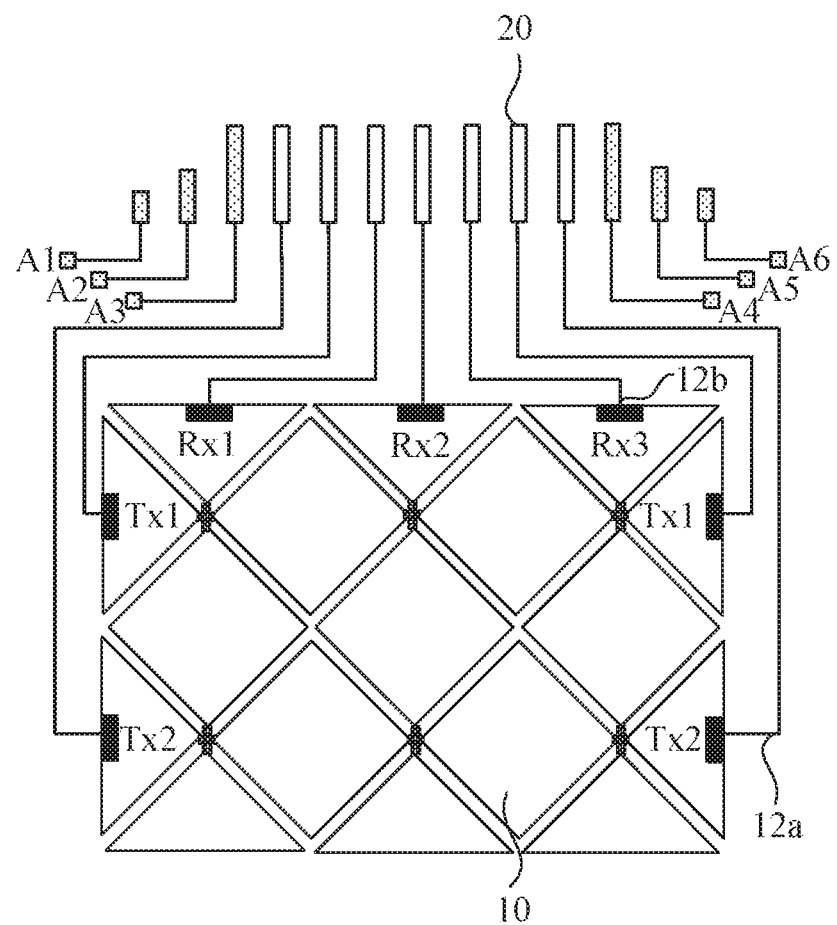
FIG. 3 shows a schematic diagram showing a design structure of a bonding region provided in an exemplary arrangement of the present disclosure.

FIG. 3 is a schematic diagram showing a design structure of a bonding region provided in an exemplary arrangement of the present disclosure. As shown in FIG. 3, a bonding region connection structure of the touch screen includes a plurality of electrode trace pins 20 and a plurality of dummy pins 30, wherein the plurality of electrode trace pins 20 are disposed in an intermediate area of a bonding region B, and the plurality of dummy pins 30 are disposed on both sides of the intermediate area of the bonding region B, i.e., disposed on both sides of the plurality of electrode trace pins 20. The plurality of electrode trace pins 20 are distributed in the intermediate area of the bonding region B in a single row array, and each of them is used to connect to a touch electrode on the touch substrate and an electrode on the flexible printed circuit. One end of each of the plurality of dummy pins 30 leading to the touch electrode is connected to a corresponding first test point by a lead wire, and used to measure impedance of the bonding region.

Combined with FIG. 3, both the "corresponding first test point" referred to herein and the "corresponding second test point" mentioned below are intended to a connection point where the dummy pin or the electrode trace pin is connected to the touch electrode in one-to-one correspondence by the lead wire.

In addition, FIG. 3 also shows the touch electrode 10, the transmitting terminal T1, Tx2 of the touch electrode 10, and the receiving terminal Rx1, Rx2, Rx3, and electrode trace 12a, 12b between the touch electrode 10 and the electrode trace pin 20, which have the same numerals as the corresponding numerals in FIG. 1, and will not be repeated herein.

In an arrangement, at least two dummy pins 30 are respectively disposed on both sides of the intermediate area of the bonding region B, as shown in FIG. 3. Take three dummy pins as an example, i.e., three dummy pins 30 are respectively disposed on both sides of the intermediate area of the bonding region. One end of each of these six dummy pins 30 leading to the touch electrode is connected to a corresponding first test point by a lead wire 60, and six test points A1, A2, A3, A4, A5 and A6 are formed on both sides of the intermediate portion of the bonding region.

It should be noted that the dummy pin 30 is led out to the corresponding first test point by the lead wire 60 to facilitate measurement. In this arrangement, the arrangement of the first test points and the wiring arrangement of the lead wires are not specifically limited, and the arrangement of FIG. 3 is only an example. The actual design process needs to be determined in combination with a specific circuit structure and there will be no short circuit due to too close distance as long as the first test point is exposed.

In an arrangement, the dummy pins 30 in this arrangement are not of equal length, but are of a gradual design. As shown in FIG. 3, the length of the dummy pin 30 on both sides gradually becomes shorter in the direction away from the intermediate portion of the bonding region. For example, a ratio of lengths of the electrode trace pin to lengths of the corresponding dummy pin in the direction away from the intermediate area of the bonding region is 1:1:0.75:0.5. In the actual design, lengths of the dummy pins 30 in FIG. 3 are: 0.5 mm, 0.75 mm, 1 mm, 1 mm, 0.75 mm, 0.5 mm, respectively, and lengths of the electrode trace pins 20 in the intermediate portion of the bonding region are 1 mm.

It should be noted that, in the description of the arrangement and FIG. 3, three dummy pins respectively disposed on both sides of the intermediate area of the bonding region, and lengths of the pins are only taken as an example. In other arrangements of the present disclosure, the number of dummy pins may also be 2 or even 4 or more, and the length of the dummy pins may be gradually changed according to a certain ratio. For example, if five dummy pins are provided on both sides, the ratio of lengths of the electrode trace pins to lengths of the corresponding dummy pins in the direction away from the intermediate area of the bonding region is 1:1:0.8:0.6:0.4:0.2.

Figure 4:
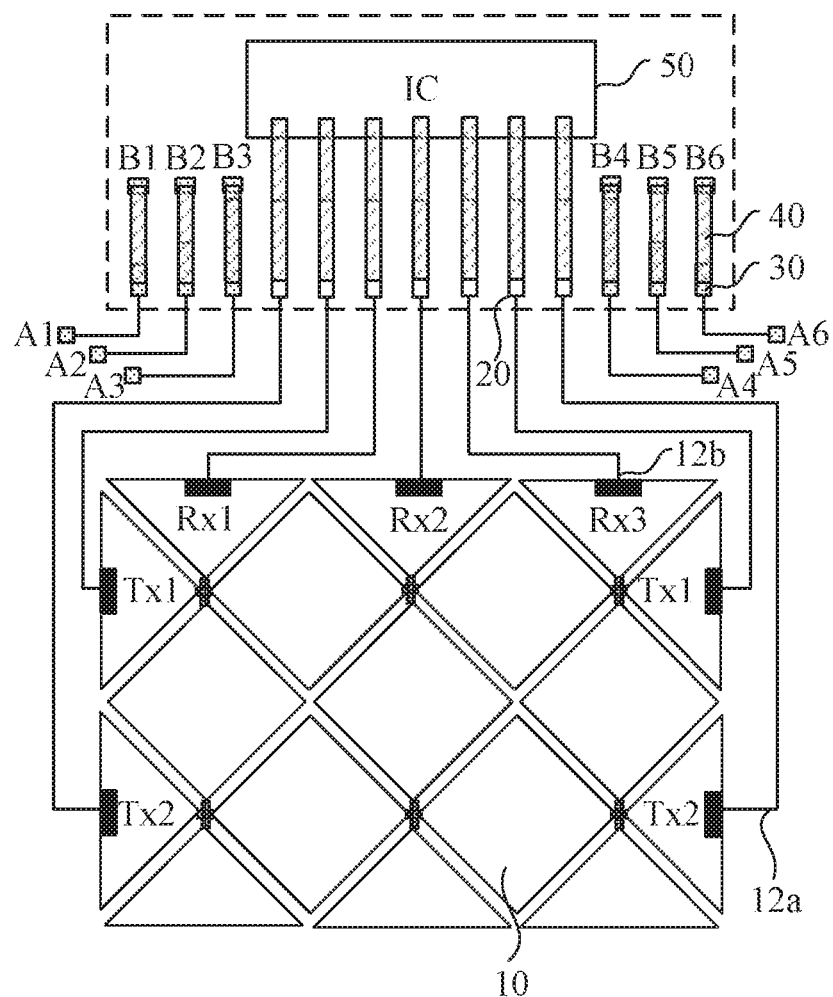
FIG. 4 is a schematic diagram showing an overall design structure of a bonding region and an integrated circuit provided in an exemplary arrangement of the present disclosure.

FIG. 4 is a schematic diagram showing an overall design structure of a bonding region and an integrated circuit provided in an exemplary arrangement of the present disclosure. On the basis of FIG. 3, one end of the dummy pin 30 leading to the integrated circuit IC is also connected by the connecting finger 40 to the second test point, the second test point corresponding to the first test point A1-A6 is numbered as B1-B6, respectively.

As shown in FIG. 4, not only the electrode trace pin 20 is connected to the inside of the IC by the connecting finger 40, but also the dummy pin 30 is connected to the corresponding second test point by the connecting finger 40, so as to form six dummy pins corresponding to six test channels, and both ends of the test channel are respectively connected to the first test point and the second test point.

In this arrangement, the first test point, the second test point, and the lead wire are made from material of the same layer, i.e., are made by the same process. If the metal material is taken as an example, after depositing the metal layer, the dummy pin, the first test point, the second test point and the lead wire are formed by using a mask plate of a predetermined pattern to be etched; wherein the width of the lead wire is smaller than the width of the dummy pin, while the width of the test point is approximately the same as the width of the dummy pin, so that the test device may be well conducted with the test point. The first test point is led out through the lead wire beyond an area below the dummy pin, and the second test point may be formed directly in an area above the longest dummy pin, and the second test point is exposed during fabrication. It should be noted that the material of the first test point, the second test point and the lead wire may also be other conductive materials other than metal.

As shown in FIG. 3 and FIG. 4, for each of the dummy pins, the dummy pin may be integrally formed with the first test point and the lead wire therebetween to ensure good conduction efficiency.

In summary, the connection structure of the bonding region provided in this arrangement may be used to monitor the conduction state of the bonding region corresponding to the pin normally connected to the electrode, and the dummy pins on both sides of the intermediate area of the bonding region firstly pass the design test point to achieve measurement of the bonding impedance. Secondly, for the first test points A1-A3, lengths with gradual design are 0.5 mm, 0.75 mm, and 1 mm, respectively. The ratio of the effective conduction areas of dummy pins corresponding to the first test points A1-A3 is 2:3:4, so that, during the monitoring process of the quality, if an abnormality occurring in the bonding region of the first test point A1 is detected, the risk of product that may occur can be predicted in time, in order to realize effective monitoring and to improve the process, thus avoiding the problem of quality monitoring lag in the process of mass production.

Based on the above, another arrangement of the present disclosure further provides a touch screen including a touch substrate, a flexible printed circuit, and a bonding region connection structure for connecting the touch substrate and the flexible printed circuit.

The beneficial effects of the touch screen provided by this arrangement are the same as those of the above-mentioned bonding region connection structure, which will not be repeated herein.

In still another arrangement of the present disclosure, a display device is further provided, the display device comprising the above-mentioned touch screen.

It should be noted that, in the arrangement of the present disclosure, the display device is not limited to that of a specific type. The display device in this arrangement may be a liquid crystal panel, an electronic paper, a mobile phone, a tablet computer, a television, a display, a notebook computer, a digital photo frame, a navigator or any product or component having display function.

Other arrangements of the present disclosure will be apparent to those skilled in the art after reading the specification and implementing the invention disclosed herein. The present application is intended to cover any variations, purposes, or adaptations of the present disclosure, which are in accordance with the general principles of the present disclosure and include common general knowledge or conventional technical means in the art that are not disclosed in the present disclosure. The specification and arrangements are to be regarded as illustrative only, and the real scope and spirit of the present disclosure is defined by the attached claims.

What is claimed is:

1. A bonding region connection structure for connecting a touch substrate and a flexible printed circuit, comprising:
   a plurality of electrode trace pins disposed at a bonding region, wherein the bonding region is between the touch substrate and the flexible printed circuit, each of the plurality of the electrode trace pins being respectively configured to connect to a touch electrode on the touch substrate and an electrode on the flexible printed circuit; and
   a plurality of dummy pins respectively disposed on both sides of the electrode trace pins, one end of each of the plurality of dummy pins leading to the touch electrode being respectively connected to a corresponding first test point by a lead wire, and configured to measure impedance of the bonding region.

2. The bonding region connection structure according to claim 1, wherein the plurality of electrode trace pins is distributed in a single row array and disposed at an intermediate portion of the bonding region, and the plurality of dummy pins respectively are disposed on both sides of the intermediate portion of the bonding region.

3. The bonding region connection structure according to claim 2, wherein the plurality of electrode trace pins has same length, and a length of the dummy pin is gradually shortened in a direction away from the intermediate portion of the bonding region.

4. The bonding region connection structure according to claim 3, wherein at least two of the dummy pins are respectively disposed on both sides of the intermediate portion of the bonding region.

5. The bonding region connection structure according to claim 4, wherein three dummy pins are respectively disposed on both sides of the intermediate area of the bonding region.

6. The bonding region connection structure according to claim 5, wherein a ratio of lengths of the electrode trace pins to lengths of the corresponding dummy pins in the direction away from the intermediate portion of the bonding region is 1:1:0.75:0.5.

7. The bonding region connection structure according to claim 6, wherein a ratio of effective conduction areas of dummy pins corresponding to the first test points is 2:3:4, and the effective conduction areas of dummy pins are gradually shortened in the direction away from the intermediate portion of the bonding region.

8. The bonding region connection structure of claim 1, wherein one end of each of the plurality of dummy pins leading to the electrode is connected to a corresponding second test point by a connecting finger, and the second test point and the first test point corresponding to the same dummy pin form a test channel.

9. The bonding region connection structure according to claim 8, wherein the first test point, the second test point and the lead wire are made from material of the same layer.

10. The bonding region connection structure according to claim 9, wherein the first test point is integrally formed with the lead wire and the dummy pin.

11. A touch screen comprising:
a touch substrate;
a flexible printed circuit; and
a bonding region connection structure for connecting a touch substrate and a flexible printed circuit, comprising:
a plurality of electrode trace pins disposed at the bonding region, wherein the bonding region is between the touch substrate and the flexible printed circuit, each of the plurality of the electrode trace pins being respectively configured to connect to a touch electrode on the touch substrate and an electrode on the flexible printed circuit, and
a plurality of dummy pins respectively disposed on both sides of the electrode trace pins, one end of each of the plurality of dummy pins leading to the touch electrode being respectively connected to a corresponding first test point by a lead wire, and configured to measure impedance of the bonding region.

12. A display device comprising a touch screen which comprises:
a touch substrate,
a flexible printed circuit; and
a bonding region connection structure for connecting a touch substrate and a flexible printed circuit, comprising:
a plurality of electrode trace pins disposed at the bonding region, wherein the bonding region is between the touch substrate and the flexible printed circuit, each of the plurality of the electrode trace pins being respectively configured to connect to a touch electrode on the touch substrate and an electrode on the flexible printed circuit; and
a plurality of dummy pins respectively disposed on both sides of the electrode trace pins, one end of each of the plurality of dummy pins leading to the touch electrode being respectively connected to a corresponding first test point by a lead wire, and configured to measure impedance of the bonding region.

* * * * *